May 8, 1962 K. E. GONZENBACH 3,034,125
RECORDER WITH SHORT PRINTER SOLENOID ENERGIZATION
Filed June 25, 1957 4 Sheets-Sheet 3

KURT E. GONZENBACH
INVENTOR.

BY
Rudolph J. Jurick
ATTORNEY

United States Patent Office 3,034,125
Patented May 8, 1962

3,034,125
RECORDER WITH SHORT PRINTER
SOLENOID ENERGIZATION
Kurt E. Gonzenbach, Newark, N.J., assignor, by mesne
assignments, to Daystrom, Incorporated, Murray Hill,
N.J., a corporation of New Jersey
Filed June 25, 1957, Ser. No. 667,812
3 Claims. (Cl. 346—79)

This invention relates to a recording instrument, and more particularly to a multiple recording instrument of the self-balancing type which is capable of measuring and recording a plurality of input signals.

The multiple point recorder of my invention is of the null-balance type, and is designed to measure and record the output from such primary elements as; thermocouples, tachometer generators, photoelectric cells, resistance thermometer bulbs, or any other transducer or converter that provides an electrical output. The mechanism employed in the recorder is adapted for use with various types of circuitry including potentiometric, Wheatstone bridge, and current balancing circuits.

The multiple recording instrument is designed to receive a plurality of input variables and, through its circuitry and mechanism, automatically measure and record the value of the condition under measurement on a chart. By way of example, a plurality of thermocouples, or other voltage sources, are connected in succession to the input of a measuring circuit, which measuring circuit includes the potentiometer or bridge circuit. An error signal from the bridge or potentiometer circuit is fed into a balancing circuit. The balancing circuit includes a converter which changes the D.-C. error signal to an A.-C. signal. An A.-C. amplifier in the balancing circuit then amplifies the A.-C. signal to a magnitude sufficient to drive a reversible motor, also in the balancing circuit. The reversible motor is driven in a direction necessary to rebalance the potentiometer or bridge in the measuring circuit. Upon actuation of the reversible motor, a carriage assembly is moved into a position along a chart corresponding to the value of the condition under measurement. The carriage assembly includes a print wheel having a plurality of printing characters formed thereon, or attached thereto. A cyclically actuated solenoid allows the print wheel to periodically drop, through action of gravity, into engagement with the chart to make a record thereon. At the same time that the print wheel is being raised off the chart following printing engagement therewith, the cyclically actuated solenoid actuates a selector switch to disconnect the voltage source just measured, and to connect another of the said sources to the measuring circuit.

A constant-speed motor is suitably geared to the chart roll for constant speed rotation thereof. The same constant speed motor drives a cam-bearing shaft through other suitable gearing. Three cam wheel members are positioned on the cam-bearing shaft and cooperate with their switches; two normally open switches and a normally closed switch. Two of the switches, a normally open and a normally closed switch, are arranged in a series circuit connection in the energization circuit of the solenoid. The positioning of the cams on the cam wheel members is such that the normally open solenoid switch is closed first, thereby completing the solenoid actuation circuit. An extremely short time thereafter, the normally closed solenoid switch is opened by a second cam member, thereby deenergizing the solenoid. By this arrangement of two cam operated switches, it will be understood that the solenoid actuation may be set whereby the solenoid is in a deenergized condition most of the cycle, and energized for extremely short periods of time; i.e., for a time necessary for a printing operation. This is highly desirable in multiple recorders and is one important feature of my invention.

During the printing operation, between the time that the first solenoid switch is closed and the second solenoid switch is opened, the third cam operated switch is actuated to a closed position. The third switch is connected in a de-sensitizing circuit, included in the balancing circuit, and more specifically, in the A.-C. amplifier of the balancing circuit. The de-sensitizing circuit functions to reduce the amplifier output signal to zero, thereby preventing excitation and consequent rotation, of the reversible motor. Consequently, movement of the print carriage is prevented during the printing operation whereby a clearly printed character is produced on the chart.

An object of this invention is the provision of a null-balance type recording instrument which is both mechanically and electrically simple in construction and requires a minimum amount of mechanism.

An object of this invention is the provision of a multiple point recording instrument in which the printing operation is effected by a normally deenergized solenoid, which solenoid is cyclically energized and deenergized.

An object of this invention is the provision of a multiple point recording apparatus in which a normally deenergized solenoid is cylically energized to actuate both the selector switch and printing mechanism.

An object of this invention is the provision of a multiple point recorder in which actuation of a normally deenergized solenoid results in gravity actuation of the printing mechanism.

An object of this invention is the provision of a multiple point recorder comprising a chart frame pivotally attached to a main frame, a normally opened switch actuated to a closed condition in the closed position of the said chart frame with respect to the said main frame, a normally deenergized solenoid cyclically energized for actuation of the recorder printing mechanism, the said normally open switch being in series circuit relation with the solenoid energization circuit, thereby preventing printing operations while the chart frame is open.

An object of this invention is the provision of a multiple point recorder in which a normally deenergized solenoid is periodically energized for short periods of time to produce a printing operation, and manually operable switch means for energizing the said solenoid at will to advance the printing cycle.

An object of this invention is the provision of a multiple point recorder having a chart drive motor which functions both to drive the chart upon which a record is to be made, and to cyclically actuate switches in the energization circuit of a printing solenoid for periodic printing operations.

An object of this invention is the provision of a recorder having a chart upon which a record is made, a recording element normally maintained out of recording engagement with the chart, electrically controlled actuating means operative when energized to effect movement of the said recorder element into recording engagement with the said chart, an energization circuit for the said actuating means and including first and second switches, means periodically actuating the said first switch to complete the said energization circuit, and means periodically actuating the said second switch to open the said energization circuit substantially immediately following each recording engagement of the said recorder element with the chart.

An object of this invention is the provision of a measuring instrument having a chart upon which a record is made, a printing carriage having a print wheel attached thereto, a shaft, means slidably and rotatably supporting the said printing carriage on the said shaft, a pivotable lever, a rod extending from the side of the said lever, the said printing carriage being slidably supported on the said rod, and means pivoting the said lever at intervals thereby moving the said rod out of sliding engagement with the said carriage and permitting the print wheel to swing into printing engagement with the chart.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views.

Figure 1:
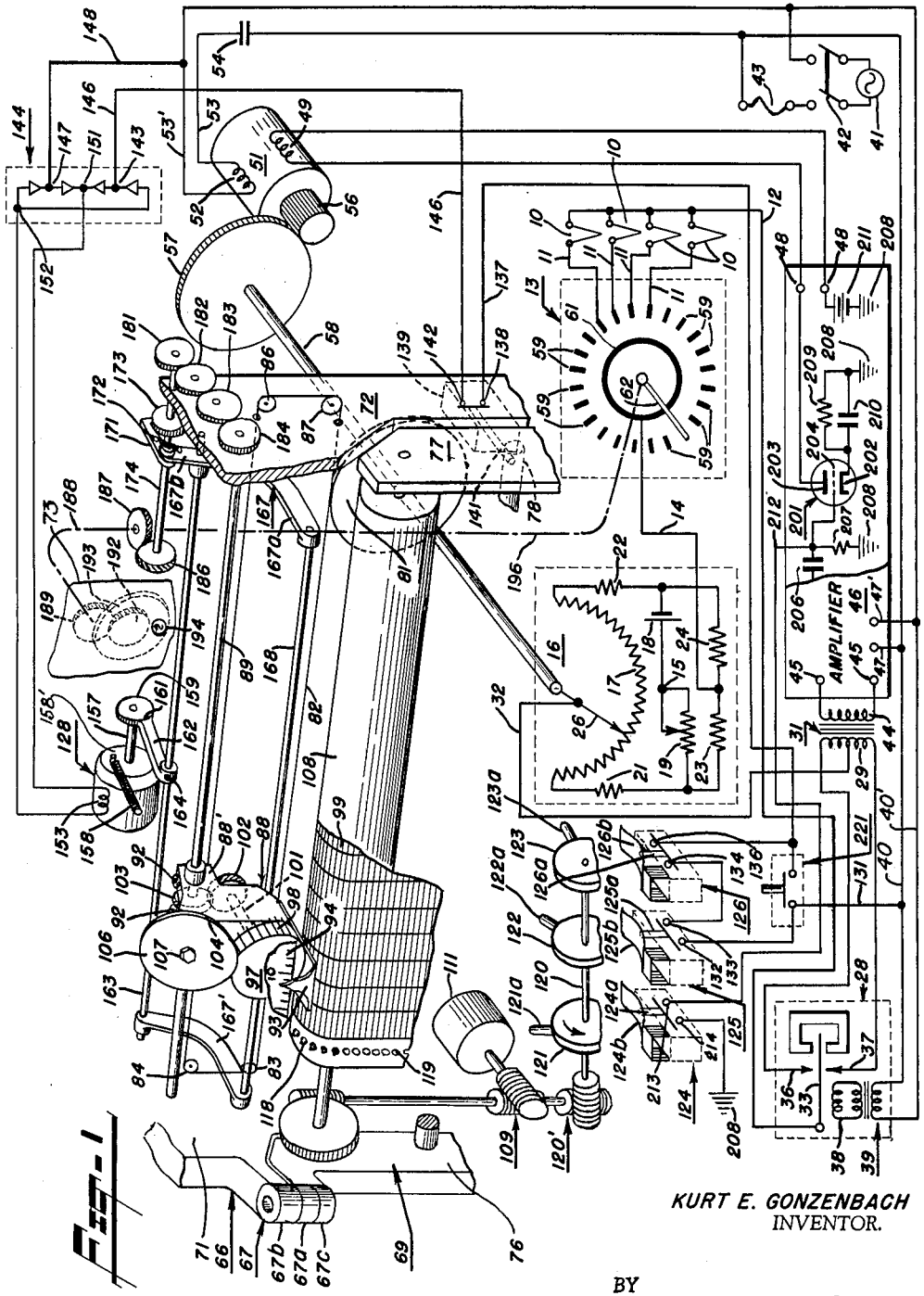
FIGURE 1 is a diagrammatic perspective view of my novel multiple recorder instrument.

Reference is first made to FIGURE 1 of the drawings wherein there is shown diagrammatically an arrangement for measuring and recording the temperatures of furnaces (not shown in the drawings) by means of individual thermocouples 10 located therewithin. In the embodiment of the invention, illustrated in the drawings, a potentiometric type circuit is employed, however, it will be understood that the invention may be used equally well in other null-balance type circuit instruments; e.g. current balancing circuits or Wheatstone bridge circuits.

The recording instrument may be located at a distance from the thermocouples 10, and suitable extension wires 11 and 12, which are often made of the same material as the thermocouples, or from materials having matching thermoelectric characteristics, may be used to connect the thermocouples from the furnace to the instrument. The wires 11, from one side of each of the thermocouples, are connected through a selector switch 13 and a lead wire 14 to one terminal 15 of a null-point potentiometric network 16. The potentiometric network includes a circular resistance wire 17 connected across a source of fixed voltage, such as a battery 18, through an adjustable resistor 19 and fixed resistors 21 and 22. The lead wire 14 from the switch 13 is connected through fixed resistors 23 and 24 to the network. The thermocouple voltage is opposed to the potential drop across a variable portion of the slidewire 17 as determined by the position of a rotatable contact 26.

The potential unbalance between one of the thermocouples 10 and the voltage derived from the potentiometric network 16 is fed in series circuit connection to a vibrator 28 and a primary winding 29 of a transformer 31 by the lead wire 12 from the thermocouples and a lead wire 32 from the potentiometric network. A movable contact 33 of the vibraor is actuated in opposite directions to alternately make and break electrical connection with a pair of spaced fixed contacts 36 and 37. Vibration of the movable arm 33 is obtained by use of a winding 38, which is connected through a transformer 39 and lead wires 40, 40', to a source of alternating potential 41. A double pole line switch 42 and fuse 43 are included in the line connections from the source of alternating potential 41 and, obviously, the switch must be closed in order to energize the recording instrument. The vibrator opens and closes the series thermocouple and potentiometric network circuits at the frequency of the alternating potential source 41. The potential unbalance between the thermocouple and potentiometric network, which unbalance is generally termed the error signal, is thereby converted to a pulsating potential at the transformer primary winding 29. The direction and magnitude of the pulsating circuit depends upon the direction of potentiometric unbalance and the amount of unbalance, respectively. With a potentiometric unbalance, an alternating current appears at the transformer secondary winding 44, which winding is connected directly to input terminals 45, 45 of an amplifier 46. The amplifier is connected through leads 47, 47' to the alternating current source 41 for a source of necessary amplifier supply voltages.

The output terminals 48, 48 of the amplifier 46 are connected to one field winding 49 (the control winding) of a reversible two phase motor 51. A second winding 52 (the reference winding) of the motor is connected to the alternating current source 41 through lead wire 53, 53' and a capacitor 54. The motor 51 will thus be energized for rotation in one direction or the other, depending upon the phase of the current in the winding 49, with respect to the current in the reference winding 52 which, in turn, will depend upon the direction of unbalance of the potentiometric circuit, as is well understood by those skilled in this art. The motor is so connected through a spur gear 56, cooperating gear 57, and a shaft 58 to the rotatable contact 26 as to move the contact in a direction to rebalance the potentiometric system; the balance point corresponding to the temperature of the furnace in which the thermocouple is connected.

The selector switch 13 functions to connect one of the thermocouples 10 at a time to the instrument. The switch is provided with a plurality of individual segments 59 to which the individual thermocouples are connected. (Only four thermocouples are shown connected to a twenty-four segment switch. Obviously, a total of twenty-four (24) inputs may be connected to the switch 13.) The individual segments are adapted to be connected to a common segment 61 by means of a rotary switch arm 62. By rotating the switch arm 62, any one of the thermocouples may be connected to the instrument input. If the furnace temperatures are different, which is the usual situation, the system will be unbalanced, and a new balance point corresponding to the new temperature will be effected.

The recording instrument includes a main framework, designated generally 66, which is hingedly fastened to a case (not shown) by means of hinge members 67, (only one of which is shown). One element 67a, of the hinge member, is connected to a side of the casing, while another element 67b is fastened to the main framework. The third hinge element 67c is fastened to a chart frame designated generally 69, and serves to pivotally mount the chart frame to the main framework. The amplifier 46 and necessary terminal boards and strips are suitably mounted in the case.

Figure 2:
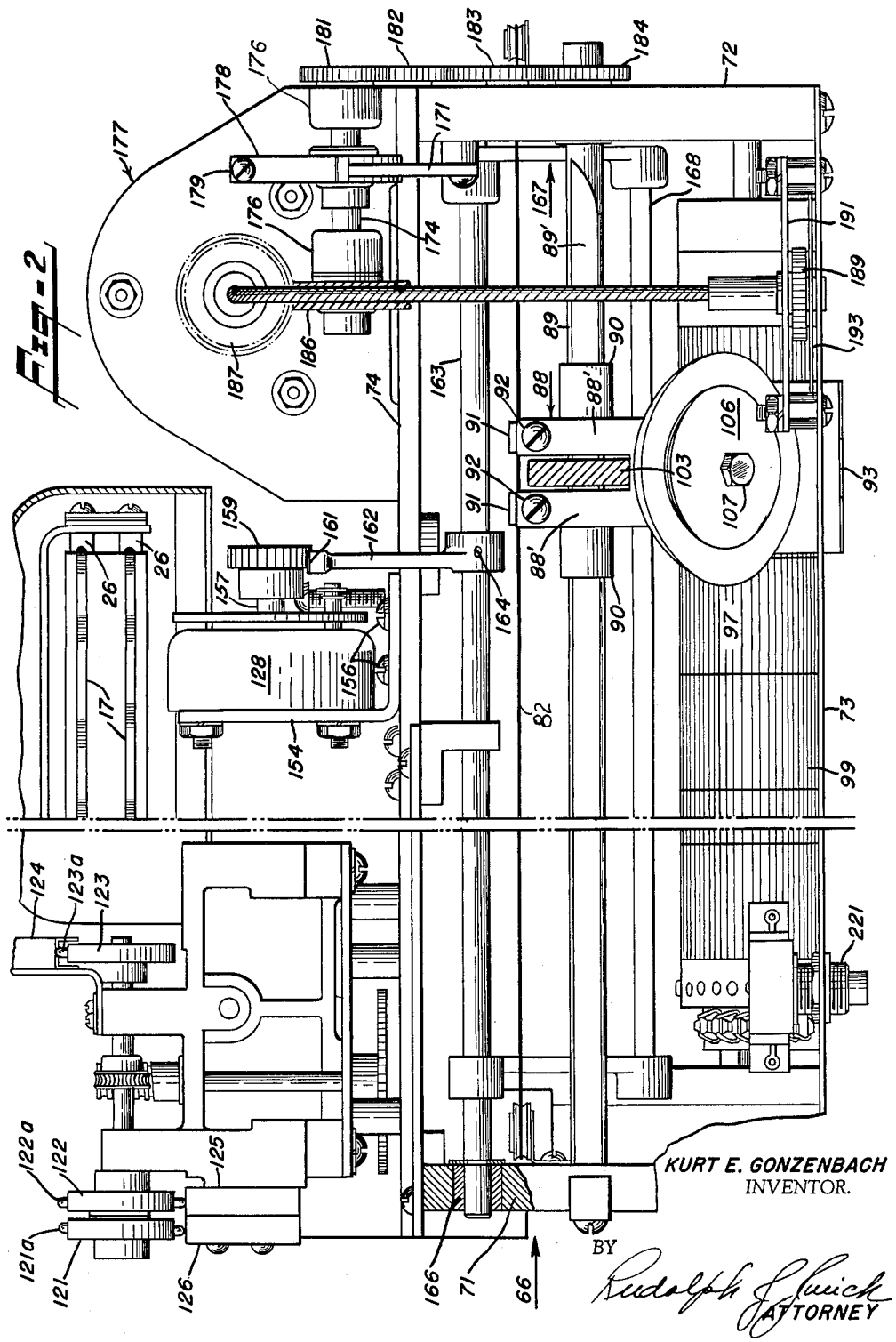
FIGURE 2 is a top view of the multiple recorder mechanism.
Figure 3:
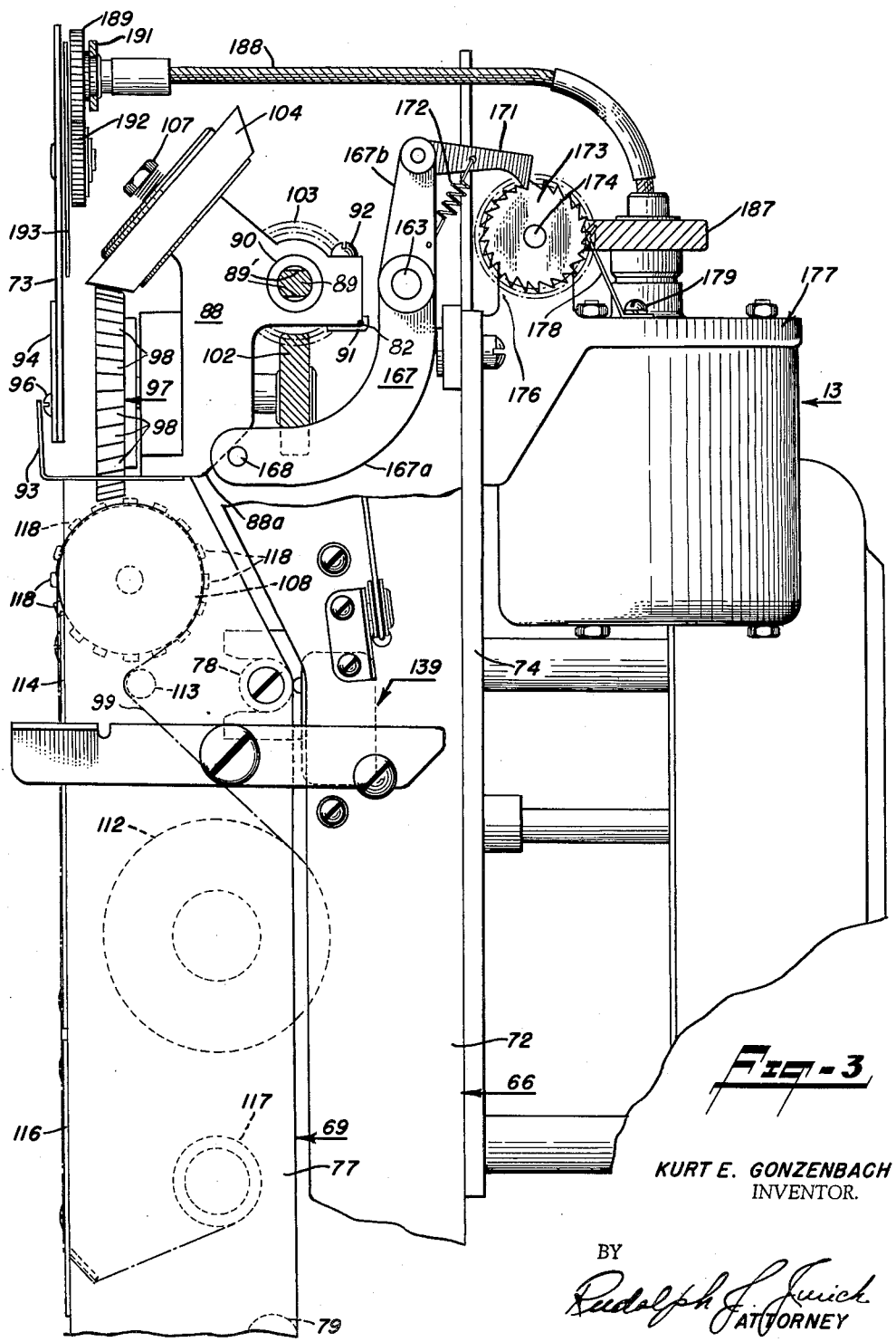
FIGURE 3 is a side view, with parts broken away for clarity, of the multiple recorder instrument.

Reference is now made to FIGURES 2 and 3 wherein top and side views, respectively, of my novel multiple recorder are shown. The main framework 66 is shown comprising a pair of spaced upright side members 71 and 72 having front and rear panels 73 and 74, respectively, secured thereto to form a rigid framework. The chart frame 69, comprises a pair of upright side members 76 and 77 (seen in FIGURE 1) rigidly fastened together by rod members 78 and 79 extending therebetween and secured thereto. (Only rod member 78 is visible in FIGURE 1; both rod members 78 and 79 being visible in broken lines in FIGURE 3.)

As seen in FIGURE 1, the shaft 58, which connects the motor 51 to the rotatable arm 26 in the potentiometric network 16, through suitable gearing, has attached thereto a cable drive drum 81. Wrapped around the cable drive drum is a cable 82 which extends from the drum around idler pulleys 83, 84, 86 and 87, which are suitably mounted on the main framework side members 71 and 72. A printing carriage designated, generally, 88 is rotatably and slidably mounted upon a carriage shaft 89 by cylindrical-shaped bushing members 90 secured to the carriage. The carriage shaft, in turn, is rotatably mounted between the side members 71 and 72. L-shaped clamp members 91 (se also FIGURES 2 and 3) are fastened to the carriage 88 by screws 92, and serve to secure the cable 82 to the carriage, whereby rotation of the cable drum in one direction or the other results in longitudinal movement of the printing carriage 88, in either direction, along the carriage shaft 89. Because both the rotatable contact 26 on the slide wire resistor 17 and the printing carriage 88 are positioned by the reversible motor 51; the position of the printing carriage 88 along this carriage shaft 89 may be taken as a measure of the temperature of the thermocouple connected to the circuit at the time. For a visual indication of the temperature, an indicating pointer 93 is attached to the printing carriage, and cooperates with a suitable scale 94 secured to the front instrument mounting panel 73 by screws 96.

A print wheel 97 is rotatably mounted on the carriage 88. The beveled periphery of the wheel is provided with a plurality of printing characters 98 suitably attached thereto. A record of the temperatures of the various thermocouples 10 is made by the printing characters upon a chart 99. The print wheel, as seen in FIGURE 1, is mounted upon one end of a shaft 101, which shaft is rotatably supported in a bore in the printing carriage 88. A helical gear 102 is secured to the other end of the shaft and cooperates with a gear 103 slidably mounted on the carriage shaft 89 between a pair of extending arm portions 88' on the carriage. Thus, the entire printing carriage assembly, including the carriage 88 and gear 103, is adapted for slidable movement along the carriage shaft 89, during the balancing of the potentiometric system by the motor 51.

The gear 103, while slidably mounted on the shaft 89, is adapted to be rotated by the shaft. As seen in FIGURES 2 and 3, the generally cylindrical-shaped carriage shaft 89, is provided with a pair of flat longitudinal surfaces. The bore in the gear 103 is provided with a pair of flat portions (not shown) which engage the flat surfaces 89', whereby the gear 103 is turned upon rotation of the shaft, and yet is free to slide longitudinally thereon. Thus, it will be understood, that upon rotation of the shaft 89, the print wheel 97 is rotated through the gears 102 and 103 and shaft 101, and an indexing operation of the print wheel is performed through this movement. The mechanism for rotating the shaft 89, and thus the print wheel 97, for each new temperature record to be made, forms an important part of my invention and is described in detail below. For the present, it will be sufficient to an understanding of the operation of the print wheel movement to note that the print wheel is rotated simultaneously with rotation of the switch arm 62 in the switch 13 which connects the different thermocouples into the circuit.

Ink is supplied to the printing characters 98 by means of an ink pad 104, which is suitably secured to an ink wheel 106. The ink wheel 106 is free to rotate upon the shank of a bolt 107 which threadedly engages the print carriage. The ink wheel is rotated upon rotation of the printing wheel due to frictional contact between the printing characters and the ink pad. Ink and print wheels, may be used in the instrument herein described, are a subject of my co-pending patent application entitled Print and Ink Wheel Mechanism, Serial Number 669,241 and filed July 1, 1957, now Patent No. 2,954,732. In my co-pending patent application, both multicolor and unicolor printing devices are described in detail, however, for purposes of this disclosure, a simple unicolor device is shown; the ink pad 104 being shown of one piece and saturated with ink of one color.

The printed record of temperature is made by the print wheel upon the chart 99 as the chart is driven over a chart driving drum 108. As seen in the digarammatic presentation of FIGURE 1, the chart driving drum 108, is driven through suitable mechanical linkage 109 by a chart motor 111. The chart motor 111 is a constant speed motor and so drives the chart at a constant speed. The gearing in the mechanical linkage between the chart driving drum and motor may, obviously, be changed to obtain different rates of speed at which the drum is driven, thus changing the chart speed. Referring again to FIGURE 3, it will be seen that the chart is supplied by a supply roll 112 which is suitably mounted between the side members 76 and 77 of the chart frame 69. (For convenience in installing the chart 99 within the instrument, the chart frame is pivoted outwardly of the main framework 66 about the hinge members 67.) The chart extends upwardly from the supply roll 112, in front of a guide rod 113, over the chart driving drum 108, down in front of chart backing plates 114 and 116, to a chart take-up roll 117; the chart rolls 112 and 117, and the guide rod 113 being suitably mounted between the chart frame side members 76 and 77. The take-up roll is driven through suitable friction drive connections from the chart driving drum 108; a frictional drive being necessary to maintain a relatively constant paper tension as the take-up roll gets larger when the chart is progressively wound thereon. The chart driving drum 108 is provided with driving pins 118 at each end thereof, which extend radially outwardly through perforations 119 in the chart to pull the chart over the drum.

The chart drive motor 111 not only drives the chart 99 but also drives a plurality of cam wheels 121, 122 and 123 which are mounted upon a shaft 120 and connected to the chart drive motor through suitable mechanical linkage designated 120', as seen in FIGURE 1. The cam wheels each have a cam member 121a, 122a and 123a, respectively, suitably secured thereto. The cam members function to actuate switches 124, 125 and 126, through switch actuator arms 124a, 125a and 126a, and switch acutator levers 124b, 125b and 126b, respectively, which actuator levers are suitably pivotally mounted on the switches. The cam members engage the respective switch actuator levers for movement of the switch arms and subsequent actuation of the switches. The switches 124 and 125 are of the normally open type while the switch 126 is normally closed. The printing operation of the recording instrument is initiated upon the closure of the normally open switch 125 by the cam member 122a and is terminated upon the opening of the normally closed switch 126 by the cam member 123a. The two switches 125 and 126 are in series circuit connection in the energization circuit of a normally deenergized, rotary, printing solenoid 128. When energized, the solenoid actuates the printing mechanism (described below), thereby permitting the print wheel 97 to drop onto the chart making a record thereon.

From one terminal of the alternating current source 41, current for the rotary solenoid energization circuit is supplied through lead wire 131 to one terminal 132 of the normally open switch 125. The other terminal 133 of the switch 125 is connected to one terminal 134 of the normally closed switch 126. The other terminal 136 of the switch 126 is connected through a lead wire 137 to one terminal 138 of a normally open switch 139; the switch being shown actuated to a closed position in FIGURE 1 by means of the rod member 78 which engages the arm 141 of the switch 139 and actuates the switch to the closed position when the chart frame 69 is closed with relation to the main framework 66. The other terminal 142 of the switch 139 is connected to one input terminal 143 of a four arm bridge rectifier network 144, of the usual type, through a lead wire 146. The other input terminal 147 of the bridge rectifier network is connected through lead wire 148 to the other terminal of the alternating current supply 41. When the line switch 42, and the switches 125, 126 and 139 are all closed, it will be apparent that the circuit from the alternating current source 41 to the input terminals 143 and 147 of the bridge rectifier network 144 is completed. The alternating current at the bridge rectifier network is converted to a D.-C. current appearing at the output terminals 151 and 152 of the network. The terminals 151 and 152 are connected directly to the power winding 153 of the D.-C. rotary solenoid 128 for actuation thereof.

By necessity, the rotary solenoid 128 is located close to the potentiometric network 16 in the measuring circuit upon an L-shaped bracket 154 secured to the rear mounting panel 74 by bolts 156. (See FIGURE 2). If an A.-C. solenoid were used in place of the D.-C. solenoid, the A.-C. stray field interference could be a serious problem in the functioning of the recorder. The stray field interference problem is minimized, however, by use of D.-C. actuated solenoid, rather than an A.-C. solenoid.

The rotary solenoid 128 is of the type which includes a shaft 157, which is rotated a predetermined amount (an amount less than a complete revolution) in a clockwise direction (as seen in FIGURE 1) against the bias action of a spring 158 connected between a disc 158' secured to the shaft 157 and a suitable support (not shown) when the solenoid is energized. When deenergized, the spring returns the solenoid shaft to a normal position. Rotary solenoids of the type shown, are available commercially and, therefore, it is believed to be unnecessary to show the solenoid in detail. It will be sufficient to an understanding of the invention to note that, upon actuation of the solenoid, the solenoid shaft 157 is rotated in a clockwise direction, as viewed in FIGURE 1, through an angle of rotation of approximately thirty (30°) degrees, and is returned to normal position by the return spring 158 when deenergized.

A spur gear 159 is secured to the solenoid shaft 157 and engages gear teeth 161 formed on the end of an arm member 162. The other end of the arm member 162 is attached to a rotatable shaft 163 by means of a set screw 164. The shaft extends between the main frame side members 71 and 72, and is rotatably supported in bushing members 166 fitted in holes therein (only the bushing at the left side as viewed in FIGURE 2 being visible). A lever 167 is suitably secured adjacent one end of the shaft 163 so as to pivot upon rotation of the shaft. The lever 167, as best seen in FIGURES 1 and 3, is provided with a generally L-shaped lower arm member portion 167a. A carriage supporting rod 168 is secured to the arm 167a adjacent the end, and extends from the side thereof. Support for the other end of the carriage supporting rod 168 is providing by an L-shaped arm member 167' which extends between the shaft 163 and rod 168, thereby completing an elongated framework which includes the rotatable shaft 163, carriage supporting rod 168, and arm members 167 and 167'. As best seen in FIGURE 3, the printing carriage 88, which is slidably and pivotally supported on the carriage shaft 89, is slidably supported against the carriage supporting rod 168 along an inclined portion 88a on the carriage 88. It will be understood that the center of mass of the print carriage assembly is positioned to the left of the print carriage shaft 89, as viewed in FIGURE 3, whereby the printing carriage is partially supported on the rod 168 in the normal, non-printing position of the carriage. In this position, the print wheel 97 on the print carriage, is positioned a spaced distance above the chart 99.

Figure 4:
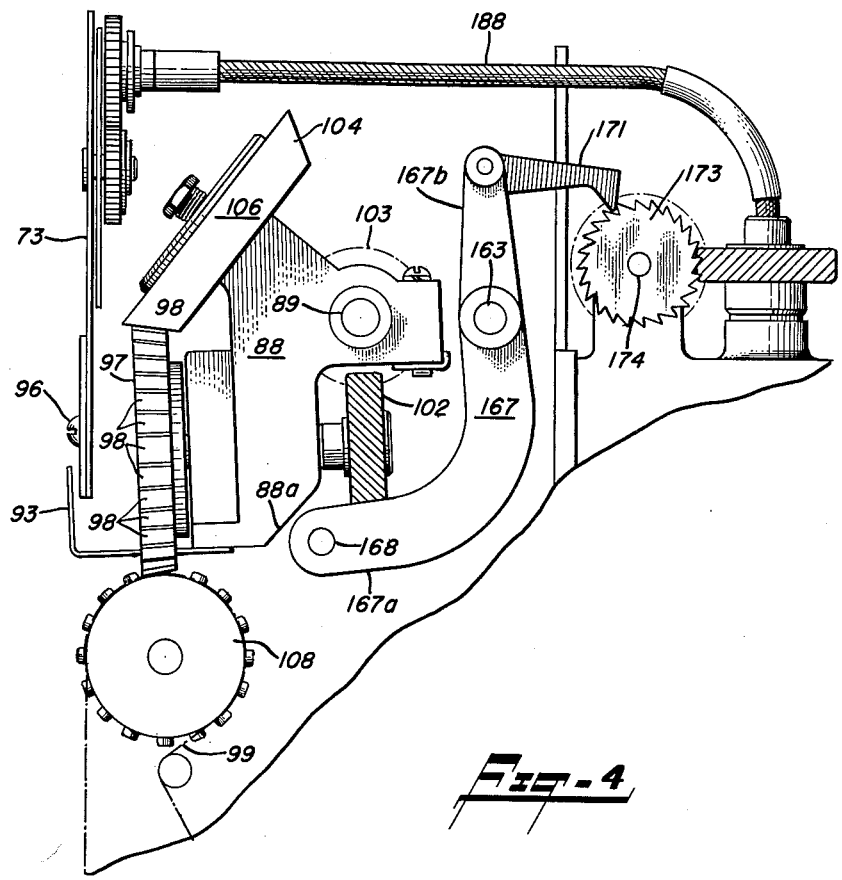
FIGURE 4 is a fragmentary side view, which is similar to FIGURE 3, but showing the print carriage in printing position.

Reference is now made to FIGURE 4 of the drawings wherein the print wheel is shown in printing engagement with the chart 99. When the rotary solenoid 128 (not shown) is energized, the shaft 163 is rotated in a counter-clockwise direction, as viewed in FIGURE 4, thereby pivoting the attached lever 167 in the same direction. The carriage supporting rod 168 is thus pivoted about the axis of the shaft 163 from a supporting position with the inclined edge 88a of the carriage 88, through a sufficient angle to permit the carriage to rotate (or drop) by action of gravity, about the carriage shaft 89 to a position wherein the print wheel 97 engages the chart 99. In this manner, a printing action takes place upon energization of the rotary solenoid 128. When the solenoid is deenergized, the spring 158 (FIGURE 1) returns the solenoid shaft to normal position, thereby pivoting the carriage supporting rod 168 back into supporting engagement with the carriage 88, and so lifting the print wheel 97 off the chart 99.

It will be understood that the printing speed depends upon the rate at which the switches 125 and 126 are actuated. Obviously, a wide variety of printing speeds is possible by use of interchangeable combinations of worm and gear drive mechanisms of the linkage 120' between the chart motor 111 and the cam wheel shaft 120, seen in FIGURE 1. The variety of possible printing speeds is further increased by the use of cam wheels 122 and 123, having a plurality of cam members thereon, instead of only one cam member each, as shown.

During the return movement of the print wheel 97 off the chart following a printing operation, the print wheel is rotated to the next adjacent printing character 98 in preparation for a subsequent printing operation. The intermittent rotation of the print wheel is effected through a pawl and ratchet mechanism. As best seen in FIGURE 3, the lever 167 includes an upwardly extending arm portion 167b having a pawl member 171 pivotally attached thereto. The pawl 171 is biased downwardly by a spring 172 into engagement with a ratchet wheel 173. The ratchet wheel is secured to a rotatable shaft 174; the shaft being rotatably supported in apertures in boss members 176 formed on a switch supporting bracket 177. (See also FIGURE 2). A flat leaf spring 178, which is mounted on the switch mounting bracket by a bolt 179, frictionally engages the ratchet wheel 173 thereby preventing rotation of the wheel, except when positively driven by movement of the pawl member 171. (Thus, the spring insures proper relative rotation of the print wheel 97.) Upon actuation of the solenoid 128, the arm portion 167b of the lever 167 is moved forward (in a counter-clockwise direction about the shaft 163, as viewed in FIGURE 3) thereby moving the pawl over the ratchet wheel in non-driving relation. When the solenoid is again deenergized, the pawl engages the ratchet wheel driving the wheel in a clockwise direction.

The shaft 174, upon which the ratchet wheel is secured, has a spur gear 181 attached to the outer end thereof. (See FIGURES 1 and 2.) The spur gear 181 is coupled, through a pair of idler gears 182 and 183 mounted upon shafts extending from the side member 72, to a gear 184 secured to the carriage shaft 89. As described above, the carriage shaft 89 is drivingly connected to the print wheel 97 through the gears 103 and 102. Thus, everytime the ratchet wheel 173 is rotated by the pawl upon return movement of the lever arm 167 to normal position the print wheel 97 is rotated in preparation for the next printing operation.

The sequential printing and print wheel indexing operations may now be understood from the above description of the instrument. Briefly, when the normally deenergized rotary solenoid 128 is energized, upon closure of the cam operated switch 125, the shaft 163 is rotated in a counter-clockwise direction (as seen in FIGURE 1) through the spur gear 159 and arm member 162. The carriage supporting rod 168 is thereby rotated about the axis of the shaft 163 a sufficient distance to permit the printing carriage 88 to drop, by action of gravity, into engagement with the chart 99. Simultaneously, the pawl 171 is drawn over the ratchet wheel 173 in non-operative relation therewith, a distance of one tooth on the wheel. Immediately following the printing operation, the rotary solenoid 128 is deenergized by opening of the cam operated, normally closed, switch 126, which is in series circuit connection with the switch 125 in the rotary solenoid energization circuit. Upon deenergization of the solenoid, the solenoid shaft 157 is returned to normal position through action of the return spring 158 (FIGURE 1) and the printing wheel is lifted off the chart 99. During the return of the printing mechanism to normal position, the pawl 171 advances the ratchet wheel 173 one tooth. Rotation of the ratchet wheel results in rotation of the print wheel an amount sufficient to bring the adjacent printing character into engagement with the chart on the subsequent printing operation, in the manner described. Simultaneously, the switch arm 62 and a visual indicator are positively rotated by the mechanism described below.

Also mounted on the intermittently rotated shaft 174 is a drive gear 186 which engages a driven gear 187, as best seen in FIGURES 1 and 2. A flexible drive shaft 188 connects the gear 187 with a spur gear 189 which is rotatably supported at the rear of the front panel 73 on a bracket member 191 (see FIGURES 2 and 3). The gear 189 engages a gear 192 having an indicating disc 193 attached thereto. The indicating disc has a series of numbers on the face thereof, which correspond to the print characters 98 on the printing wheel 97. One number at a time on the indicating disc is visible through a hole 194 formed in the front panel 73. The indicating disc numerals are synchronized with the printing wheel characters such that the number on the disc visible through the hole corresponds to the next printing character to be printed. With the above described arrangement, the indicating disc is easily seen from the front of the instrument.

Extending from the bottom side of the gear 187 is a shaft 196 which is directly connected to the rotary switch arm 62 of the switch 13. Thus, the same intermittent rotation of the shaft 174, which advances the print wheel and indicator disc, also serves to connect another thermocouple to the instrument input. Synchronizing between the selector switch 13, print wheel 97 and indicator disc 193 is thereby guaranteed by the above-described mechanism.

When the rotary solenoid 128 is switched on and off, relatively strong electrostatic fields are established which, in turn, may induce substantial stray voltages in the measuring circuit and amplifier input circuit. Such stray voltages will be amplified by the amplifier 46. Occasionally, if the phase angle and magnitude permits, the amplified stray voltages will cause actuation of the reversible motor 51, and, therefore, displacement of the printing carriage during the printing cycle. To prevent such movement during the printing cycle, together with the resultant blurred record, I have shown, in FIGURE 1, a system for desensitizing the amplifier 46 during the printing cycle. The desensitizing system shown in the drawings, and described below, comprises the subject matter of a copending United States patent application Serial Number 664,071, of Ernst Umrath, entitled Desensitizing Circuit and filed June 6, 1957, now abandoned. The desensitizing system described in the present application illustrates only one method of preventing movement of the printing carriage during a printing operation; any other suitable system, or method, may be used.

The desensitizing circuit for the amplifier 46 is preferably connected to the final stage of amplification thereof. As seen in FIGURE 1, the final stage of amplification includes an electron tube 201 having a cathode 202, an anode 203, and a grid 204 therebetween. The amplifier error signal from a previous stage of amplification (not shown) is connected to the grid of the tube through a capacitor 206, and is developed across a grid resistor 207 connected to a common ground terminal 208. The cathode 202 is connected through the usual bias producing cathode resistor 209 and capacitor 210 to the common ground terminal 208. A source of positive potential 211 is connected from the common ground terminal 208 to one of the amplifier output terminals 48. The other output terminal 48 is connected to the anode 203 of the tube 201. Thus, the anode current of the tube 201 passes through the control winding 49 of the reversible motor 51, which control winding is connected to the amplifier output terminals 48.

Desensitization of this final stage of amplification is effected by connecting the amplifier grid 204 through lead wire 212 to one terminal 213 of the desensitizing switch 124. The other terminal 214 of the switch is connected to the common ground 208. Thus, it will be understood that when the switch 124 is closed, the grid 204 is grounded, thus resulting in zero input and output signals from the tube 201. With no amplifier output signal, the motor 51 remains stationary. The desensitizing switch 124 is closed during the printing operation; that is, the cam member 121a on the wheel 121 is adjusted to close the switch 124 at the same time, or immediately prior to the closing of the rotary solenoid actuator switch 125, and to maintain the switch in the closed position until immediately following the actuation of the switch 126 to an open position. The amplifier output is thereby reduced to zero, and energization of the motor 51 prevented during the printing operation when the printing wheel contacts the chart. A blurred record, or torn chart, is thereby avoided.

In shunt connection across the series connected cam operated switches 125 and 126, (as seen in FIGURE 1), is a push button switch 221. The push button switch is conveniently mounted on the front panel 73 (see FIGURE 2). By manually actuating the push button switch, the rotary solenoid 128 may be energized at will. By repeatedly actuating and releasing the push button, the printing mechanism may be advanced to any desired point. This is particularly useful for check purposes with a slow printing instrument wherein the time between successive printing operations is relatively long. By actuating the push button switch, the reading may be made without waiting for the recorder to reach the desired input through the normal cyclic operation thereof.

As seen in FIGURE 1, and described above, the rotary solenoid energizing circuit includes a series connected chart frame switch 139, which switch is of the normally open type and is closed by action of the rod 78 when the chart frame 69 is closed with respect to the main framework 66. As described above, the chart 99 is mounted upon rolls in the chart frame, while the printing wheel is mounted within the main frame. It will be understood that if the chart frame is open, or not properly closed, the switch 139, and thus the rotary solenoid energization circuit, is open, thereby preventing a printing operation. If a printing operation occurred when the chart frame was open, the printing characters 98 could be damaged through misalignment between the printing characters and the drive roll 108. Damage to the printing characters is thus prevented by means of the switch 139. Further, it is often desirable to make a continuous observation of one input, particularly if the input is going through abnormal fluctuations. By opening the chart frame at the appropriate time, in the switching cycle, the selector switch 13 may be stopped with any desired thermocouple input. The value of the one input is continuously indicated by the position of the pointer 93 along the scale 94.

Normally, a recording instrument of the potentiometric type is provided with a standardization mechanism whereby the potentiometer 19 is adjusted periodically to compensate for the normal decrease in strength of the battery 18. Ordinarily, a standard cell is connected into the potentiometer circuit by means of a cam, or manually actuated standardization switch. Associated with the standardization switch actuating mechanism is a clutch connecting the balancing motor 51 to the movable contact of the potentiometer 19 so that rotation of the motor, due to an unbalanced network 16, operates to adjust the potentiometer 19 and recalibrate the network. None of the details of the above described standardization network are shown in the drawings, as the standardization system forms no part of this invention. It will be understood, however, that it is highly desirable to include a second standardization switch in series circuit connection with the rotary solenoid energization circuit, which switch is normally closed, but is opened during standardization.

Opening of the switch during standardization would thereby prevent the instrument from printing a false record on the chart 99 when standardization occurs. A false record could otherwise occur without the second standardization switch due to the cycle operation of the solenoid actuation switches 125 and 126.

From the description of the recorder, it will be seen that I have provided a simple recorder mechanism which utilizes a minimum of parts. The rotary solenoid for initiating a printing operation is normally deenergized. Cyclic operation of a pair of cam operated switches completes the solenoid energization circuit for short intervals of time, the time being just sufficient for the printing wheel to make a record on the chart. By making the solenoid "on time" very short, it is necessary to desensitize the amplifier 46 for only short periods of time. Thus, the time during which the recorder does not follow an input signal is made short, and this, of course, is highly desirable. In addition, the less time that the solenoid is energized, the less heat will be developed at the solenoid. A constant temperature, particularly near the measuring circuit, is desirable to prevent undue drift in the balance condition. It will further be understood, that the use of first and second solenoid energization circuit switches, to permit short energization "on time" intervals of the solenoid, is not confined to the "gravity type" printing described and shown. The system which includes first and second solenoid energization circuit switches may be used advantageously with other types of printing mechanism. Conversely, other energization circuitry may be used in conjunction with my novel "gravity type" printing mechanism.

Having now described my invention in detail, in accordance with the patent statutes, various other changes and modifications will suggest themselves to those skilled in this art. It is intended that such changes and modifications shall fall within the spirit and scope of the invention as recited in the following claims.

I claim:

1. A recorder comprising a driving means arranged to drive at constant speed a chart upon which a record is to be made, first and second switches of the normally open and closed types, respectively, arranged to be sequentially actuated by said driving means, a recording element, means for normally maintaining said element out of recording engagement with the chart and returning it when released, electrically controlled actuating means operative, when energized, to effect movement of the said recorder element into recording engagement with the said chart, and an energizing circuit for the said actuating means and including the said first and second switches connected in series circuit relation with a source of energizing potential.

2. A recorder comprising a first driving means arranged to drive a chart upon which a record is to be made, first and second switches of the normally open and closed types, respectively, and arranged to be sequentially actuated by said first driving means, a recording element, means for normally maintaining said element out of recording engagement with the chart and withdrawing it from said chart after such an engagement, second drive means arranged normally to shift the said recording element across the chart to a position corresponding to the value of the condition to be recorded, electrically controlled actuating means operative when energized to effect movement of the said recorder element into recording engagement with the said chart, and an energizing circuit for the said actuating means and including the said first and second switches connected in series circuit relation with a source of energizing potential.

3. The invention as recited in claim 2 including means preventing operation of the said second drive means during a recording operation.

References Cited in the file of this patent

UNITED STATES PATENTS

| | | |
|---|---|---|
| 997,353 | Yaxley | July 11, 1911 |
| 1,517,652 | Quarles | Dec. 2, 1924 |
| 2,113,069 | Ross, et al. | Apr. 5, 1938 |
| 2,425,080 | Blakeslee | Aug. 5, 1947 |
| 2,447,803 | Hobby | Aug. 24, 1948 |
| 2,519,537 | Barnes | Aug. 22, 1950 |
| 2,628,994 | Goodman | Feb. 17, 1953 |
| 2,665,964 | Olah, et al. | Jan. 12, 1954 |
| 2,701,748 | Anderson | Feb. 8, 1955 |
| 2,719,293 | Hornbruch et al. | Sept. 27, 1955 |
| 2,766,389 | Arko | Oct. 9, 1956 |
| 2,791,481 | Jordan | May 7, 1957 |
| 2,933,319 | Proctor | Apr. 19, 1960 |